Figure 1:
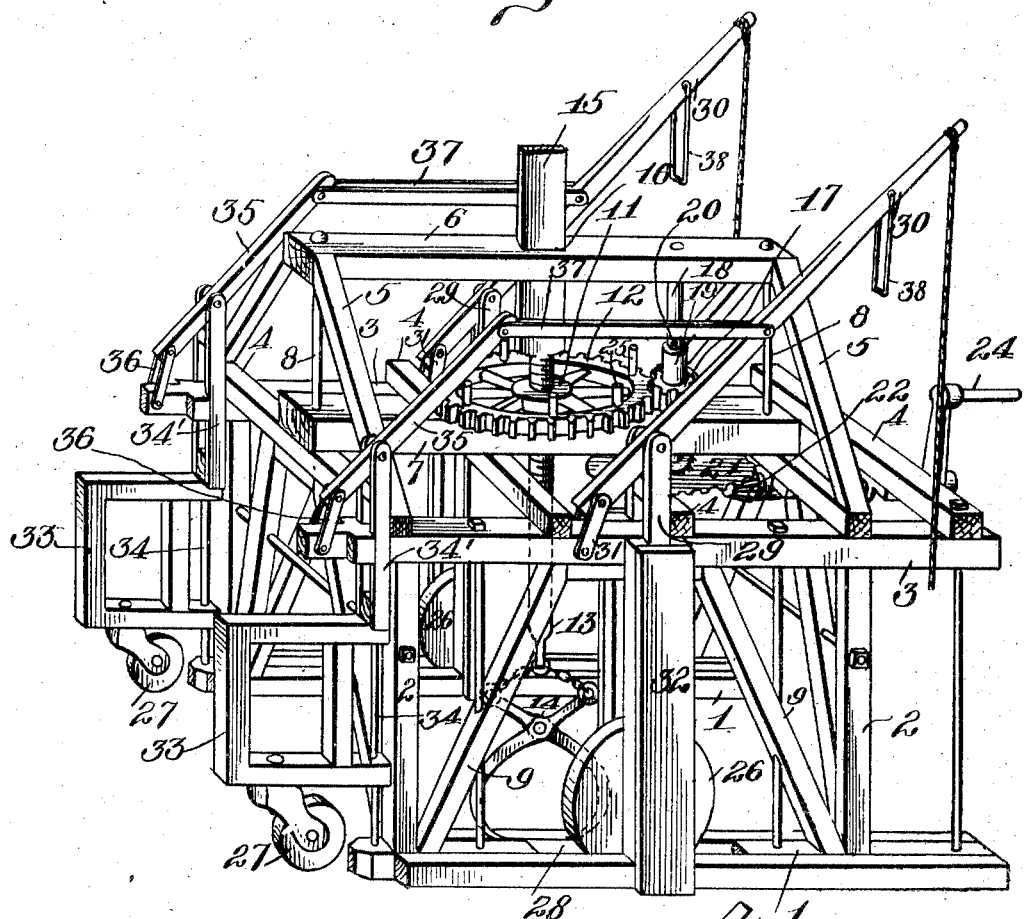

No. 764,321. PATENTED JULY 5, 1904.
C. R. TWITTY.
STUMP EXTRACTOR.
APPLICATION FILED JAN. 5, 1904.
NO MODEL. 2 SHEETS—SHEET 1.

Witnesses
Inventor
Chapman R. Twitty

No. 764,321. PATENTED JULY 5, 1904.
C. R. TWITTY.
STUMP EXTRACTOR.
APPLICATION FILED JAN. 5, 1904.
NO MODEL. 2 SHEETS—SHEET 2.
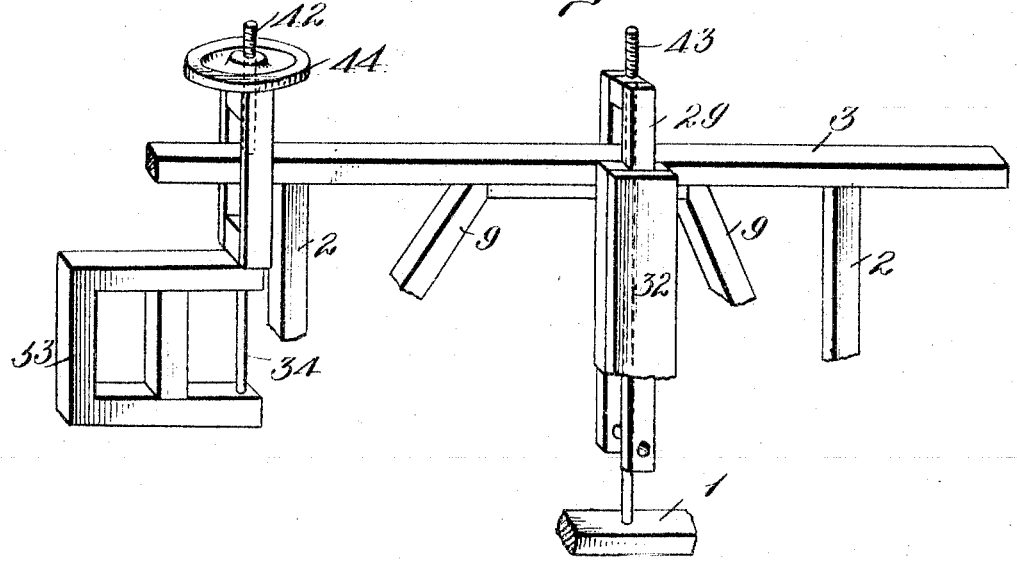
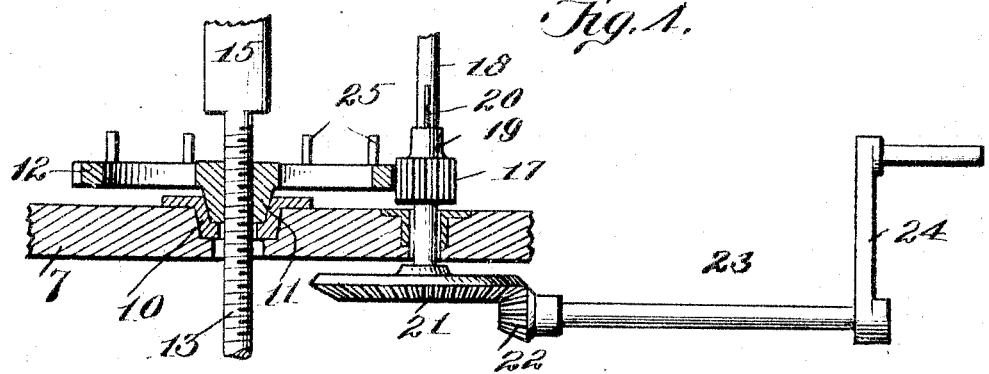
Witnesses:
Inventor
Chapman R. Twitty No. 764,321. Patented July 5, 1904.

UNITED STATES PATENT OFFICE.

CHAPMAN R. TWITTY, OF CAMILLA, GEORGIA.

STUMP-EXTRACTOR.

SPECIFICATION forming part of Letters Patent No. 764,321, dated July 5, 1904.

Application filed January 5, 1904. Serial No. 187,843. (No model.)

*To all whom it may concern:*

Be it known that I, CHAPMAN R. TWITTY, a citizen of the United States, residing at Camilla, in the county of Mitchell and State of Georgia, have invented new and useful Improvements in Stump-Extractors, of which the following is a specification.

This invention relates to stump-extractors.

The object of the invention is in a ready and certain manner and with the output of the minimum of energy to extract stumps from the ground and, if desired, to transport them while suspended from the machine to any point; furthermore, to improve machines of this character by simplifying their construction and disposing the operative parts thereof in such manner that danger of injury in use is reduced to a minimum and the making of repairs is greatly facilitated.

Generally stated, the machine of this invention embodies in its construction a grapple-mechanism-supporting frame and a wheeled frame combined therewith and adapted to be brought to position to permit transportation of the machine when necessary, the wheeled frame being normally out of coactive relation with the ground, thus to cause the supporting-frame to remain rigid during the operations of the grapple mechanism.

Resource may be had to various mechanical expedients to effect raising and lowering of the wheeled frame to cause it positively to hold the grapple-mechanism-supporting frame either out of or in contact with the ground, and in this instance three forms of mechanism are shown, one of which embodies a plurality of levers connected to the wheeled frame in such manner that when the levers are depressed the wheels are forced into contact with the ground, thereby elevating the grapple-mechanism-supporting frame. Another arrangement of mechanism for the above purpose embodies a series of levers connected with the wheeled frame and ropes and sheaves for transmitting motion from one set of levers to the other to effect simultaneous movement of the parts of said frame. A still further arrangement of mechanism for operating the wheeled frame consists of a plurality of independently-operable screws for raising or lowering the frame.

In order that the machine as a whole may be turned sharply when being moved from point to point, the forward supporting-wheels are in the nature of caster or furniture wheels, which are carried by brackets having a pivoted or hinged connection with the grapple-mechanism-supporting frame, the arrangement being such that the machine may be turned in its own length. This will be found of great convenience, especially where the field in which the machine is operating is thickly studded with stumps, as it will enable the operator without trouble to avoid contact with the stumps and will further facilitate the proper positioning of the machine over the stump to be extracted.

With the above and other objects in view, as the nature of the invention is better understood, the same consists in the novel construction and combination of parts of a stump-extractor, as will be hereinafter fully described and claimed.

In the accompanying drawings, forming a part of this specification, and in which like characters of reference indicate corresponding parts, there is illustrated a preferred form of the invention, together with two slight modifications thereof, it being understood that the elements therein exhibited may be varied or changed as to shape, proportion, and exact manner of assemblage without departing from the spirit thereof, and in these drawings—

Figure 2:
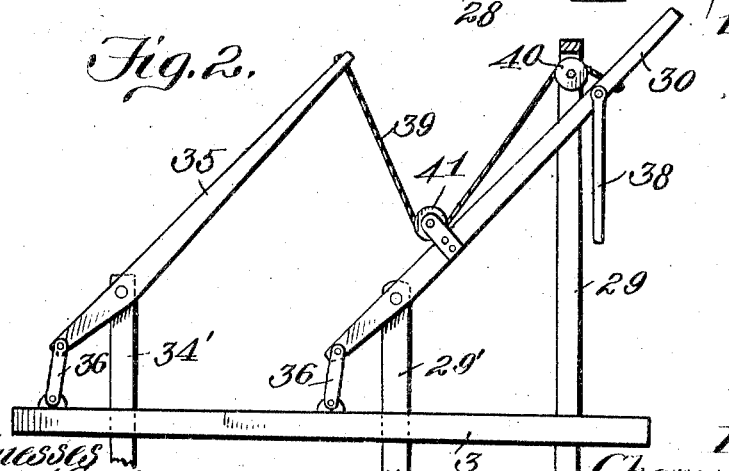

Figure 1 is a view in perspective of a stump-extractor constructed in accordance with the present invention. Fig. 2 is a view in elevation of one of the modified forms of invention. Fig. 3 is a perspective view of another modified form of the invention. Fig. 4 is a sectional detail view.

Referring to the drawings and to Fig. 1 thereof, there is exhibited a stump-extractor constructed in accordance with the present invention and embodying a frame supporting grapple mechanism and means for actuating the same and a wheeled frame adapted to be brought into contact with the ground when it is desired to transport the structure from one point to another or for other purposes. The grapple-mechanism-supporting frame embodies two sills 1, which may be of any preferred length, a plurality of uprights 2, in this instance two in number, on each side of the machine, a pair of longitudinally-disposed beams 3, which project at each end beyond the uprights 2, cross-beams 4, in this instance four in number, rigid with the beams 3, two pairs of inclined brace-beams 5, and a top beam 6, rigid with the brace-beams 5. Intermediate of the ends of the cross-beams and extending longitudinally of the frame is a supporting-beam 7, which is held assembled with the cross-beams and the top beam 6 by tie-rods 8. The lower portion of the grapple-mechanism-supporting frame is braced and rendered rigid by angularly-disposed braces 9, in this instance shown as two in number, although it is to be understood that, if preferred, three or more may be employed and still be within the scope of the invention.

Seated within a recess in the supporting-beam 7 is a socket 10, in which fits the hub 11 of a gear or master wheel 12, the socket being provided for the purpose of permitting the wheel to rotate readily and to be held in proper operative relation with regard to the supporting-beam. (See Fig. 4.) The hub of the gear 12 is internally threaded and engages a screw 13, which passes through the beam 7 and carries at its lower end suitable grapple mechanism 14, which may be of the ordinary ice-tongs type or otherwise. The upper end of the screw is flattened or is provided with a head 15, which passes through a correspondingly-shaped opening 16 in the top beam 6, the object for flattening the screw or providing it with a head being to hold the screw against turning as it is being raised or lowered through the medium of the wheel 12. The master-wheel is driven through the medium of a pinion 17, splined upon a shaft 18 and being provided with a collar 19 for preventing any lost motion when rotating on the shaft 18 and also to present an extended bearing, which will prevent any rocking movement, with attendant danger of breakage of the pinion. This pinion is normally in engagement with the gear-wheel 12; but, if desired, it may be thrown out of mesh therewith by simply moving it up upon the shaft 18 and inserting a pin 20 beneath its under face. The lower end of the shaft 18 carries a bevel-gear 21, which is engaged by a miter-gear 22, carried by a shaft 23, the outer end of which latter is furnished with a crank 24 for turning the shaft 23. Where great power is needed for extracting a stump, the train of gears 22, 21, and 17 will be employed; but should the stump be but lightly embedded in the ground, and thus not requiring much force to remove it, the pinion 17 may be thrown out of mesh with the gear 12 in the manner stated and the gear be operated by hand for raising the screw 13. To facilitate the turning of the wheel 12, its rim is provided with a plurality of upstanding handles 25.

When the machine is being used, the wheels do not rest upon the ground, so that there will be no movement or danger of shifting; but when the machine is to be transported to bring it over a fresh stump or for the purpose of removing it from the field the wheeled supporting-frame is brought into play to raise the sills free from the ground. There are two sets of wheels 26 and 27, the former being at the rear portion of the machine and the latter at the front portion and being ordinary caster-wheels. The wheels 26 project through openings 28 in the sills, and each is carried by two uprights 29, which straddle the beams 3 and have connected with their upper portions a lever 30, the forward end of each lever being connected with the beams 3 through the medium of links 31. The uprights 29 are guided for vertical movement between guides 32, secured at their lower and upper ends, respectively, to the sills and beams 3. As herein shown, there are but two of the wheels 26 employed; but it will be obvious that, if preferred, two other wheels may be employed, which may be carried by the uprights 29 and be disposed upon the outsides of the sills, and as this will be readily understood detailed illustration is deemed unnecessary.

As shown in Fig. 1, the side sills 1 have slots through which the wheels 26 can pass as the wheeled frame is either raised or lowered.

The front wheels or casters 27 are carried by brackets 33, which are hinged upon rods 34, each having its lower end seated in the sill 1 and its upper end in the beam 3. Each of these brackets has a swivel connection with a standard 34', in this instance constructed of two pieces of suitable material, which straddle the beam 3 and have connected with their upper ends a lever 35, pivotally connected with the uprights 34. The lower end of each of the levers 35 is connected with the beam 3 through the medium of a link 36. In order to secure simultaneous action either in lifting or lowering the wheels 26 or 27, the levers 35 are connected with the levers 30 through the medium of links 37, as clearly shown in Fig. 1. It will be seen that when the levers 30 are drawn down the parts 29 and 34' will be forced down, thus bringing the two sets of wheels into contact with the ground and elevating the sills thereabove. In order to hold the grapple-mechanism-supporting frame in its elevated position, a bail or link 38 is combined with the free end of each of the levers 30, and when the frame has been raised in the manner described these bails or links are hooked over the protruding ends of the beams 3, thus locking the parts in adjusted position. When the grapple-mechanism-supporting frame is again to contact with the ground, the bails 38 are simply moved out of engagement with the beam 3, whereby the frame by gravity will drop. In moving the machine from one part of the field to another when the grapple-mechanism-supporting frame is elevated a horse is connected in any suitable manner with the brackets 33, and it will be seen that owing to the manner in which the brackets are disposed, together with the swiveled casters or wheels 27, the machine may be readily moved over a stump. The space between the two sides of the grapple-mechanism-supporting frame will be amply sufficient to allow the machine to be moved over a stump of any ordinary height.

In the use of the uprights thus far described where a stump is to be removed the crank 24 is rotated in the direction requisite to bring the grapple mechanism 14 into engagement with the stump, and upon turning the crank in the reverse direction the screw 13 is raised, thereby tearing the stump free from the ground.

As shown in Fig. 2, instead of employing the links 37 for connecting the two sets of levers ropes 39 may be employed, each of said ropes being secured at one end to the lever 30, thence passed over a sheave 40, carried by the lever-supports 29′, thence around a sheave 41, carried by the lever 30, and thence upward to the free ends of the levers 35.

As shown in Fig. 3, the levers exhibited in Figs. 1 and 2 may be dispensed with and in lieu thereof two independently-operable screws 42 and 43 may be employed, the screw 43 being seated in the sill 1 and the screw 42 bearing at its upper end upon the beam 3. A hand-wheel 44 is provided for turning the screws 42 and 43. While this form of device will be found thoroughly efficient in use, it will be understood that the invention is not to be limited to the precise manner in which the screws are arranged, as they may be otherwise disposed and operated and still be within the scope of the invention.

Having thus described the invention, what I claim is—

1. In a machine of the class described, a frame having suitably-connected side members, and a top beam above and rigidly connected with said side members, a rotative wheel internally threaded, supported by said frame, and a screw to fit the internal threads of the wheel, said top beam being arranged to prevent rotative movement of the screw when the wheel is turned.

2. In a machine of the class described, a frame having suitably-connected side members and a top beam above and rigidly connected with said side members, a rotative wheel internally threaded, supported by said frame, and a screw to fit the interior threads of the wheel, having a rectangular head, said top beam being slotted to receive said head, and grapple mechanism connected with the screw.

3. In a machine of the class described, a frame having suitably-connected side members and a top beam above and rigidly connected with said side members, a rotative wheel, internally threaded, supported by said frame, a screw to fit the threads of the wheel, the latter having a rectangular head, and the top beam being slotted to receive said head, to thereby prevent the screw from turning, grapple mechanism connected with the screw, and a wheeled frame coöperative with the other frame, mounted for rising-and-falling movement relatively thereto.

4. In a machine of the class described, a frame having side members, transverse beams connecting the same, a top beam located substantially centrally between the side members and above said transverse beams, having a slot between its ends, a longitudinal beam supported by the transverse beams, below and in parallelism with said top beam, a wheel rotatively mounted upon said longitudinal beam, internally threaded, a screw, the threaded surface of which is adapted to coöperate with the threads of the wheel and having a polygonal head to fit said slot, and grapple mechanism connected with the lower end of the screw.

5. In a machine of the class described, a frame, a rotative wheel suitably supported by said frame, having internal threads, a screw to engage the internal threads, held against rotation by said frame, a second frame provided with wheels, wheeled brackets swiveled to the first frame, standards swiveled to said brackets, and means supported by the first frame for simultaneously lowering the second frame and said swiveled brackets.

6. In a machine of the class described, a frame having grapple mechanism, a wheeled frame suitably guided by the first frame, rods carried by the first frame, brackets provided with wheels said brackets being arranged to turn on said rods, standards swiveled to the brackets, and means for simultaneously lowering said standards and wheeled frame.

7. In a machine of the class described, a frame having grapple mechanism, a wheeled frame guided by the other frame, brackets having wheels said brackets being swiveled to the first frame, standards guided by the first frame and swiveled to the brackets, and operatively-connected levers flexibly supported by the first frame and serving to operate respectively the wheeled frame and brackets.

8. In a machine of the class described, a supporting-frame, a screw carried thereby and held from turning, grapple mechanism carried by the lower end of the screw, a gear-wheel having a threaded hub engaging the screw, and a train of gears for driving the gear-wheel, one of the gears of the train being shiftable with relation to the gear-wheel.

9. In a machine of the class described, a supporting-frame, a screw carried thereby and held from turning, grapple mechanism carried by the lower end of the screw, a gear-wheel having a threaded hub engaging the screw, and a train of gears for driving the gear-wheel, one of the gears of the train being shiftable with relation to the gear-wheel, and the latter having handles, whereby it can be operated independently of the shiftable gear.

10. In a machine of the class described, a supporting-frame provided with sills having openings, grapple mechanism supported by the frame, movable uprights carrying wheels projecting through the openings in the sills, brackets having a swivel connection with the supporting-frame and carrying caster-wheels, a connected series of levers for simultaneously lifting the supporting-frame, thus to bring the wheels into contact with the ground, and means for locking the levers in their depressed positions, thus to hold the supporting-frame elevated.

In testimony whereof I have hereunto set my hand in presence of two subscribing witnesses.

CHAPMAN R. TWITTY.

Witnesses:
  J. L. BROWN,
  ROB BUTLER.